US007667159B2

(12) United States Patent
Pailthorp et al.

(10) Patent No.: US 7,667,159 B2
(45) Date of Patent: Feb. 23, 2010

(54) RESOLVING THERMOELECTRIC POTENTIALS DURING LASER TRIMMING OF RESISTORS

(75) Inventors: Robert M. Pailthorp, Portland, OR (US); Brandon McCurry, Portland, OR (US)

(73) Assignee: Electro Scientific Industries, Inc., Portland, OR (US)

(*) Notice: Subject to any disclaimer, the term of this patent is extended or adjusted under 35 U.S.C. 154(b) by 936 days.

(21) Appl. No.: 11/218,283

(22) Filed: Aug. 31, 2005

(65) Prior Publication Data

US 2006/0065646 A1    Mar. 30, 2006

Related U.S. Application Data

(60) Provisional application No. 60/609,852, filed on Sep. 13, 2004.

(51) Int. Cl.
*B23K 26/36* (2006.01)
(52) U.S. Cl. ............................ 219/121.69; 219/121.68
(58) Field of Classification Search .................. 219/56, 219/56.1, 58, 121.12, 121.19, 121.62, 121.68
See application file for complete search history.

(56) References Cited

U.S. PATENT DOCUMENTS

| 4,429,298 | A |   | 1/1984  | Oberholzer ................. 338/195 |
|-----------|---|---|---------|--------------------------------------|
| 4,622,856 | A | * | 11/1986 | Binder et al. ................. 73/727 |
| 4,935,694 | A |   | 6/1990  | Clarridge ................... 324/158 |
| 5,420,515 | A |   | 5/1995  | Uhling et al. ............... 324/601 |
| 5,428,204 | A |   | 6/1995  | Uhling et al. .......... 219/121.68 |
| 5,446,260 | A |   | 8/1995  | Uhling et al. .......... 219/121.69 |
| 5,685,995 | A |   | 11/1997 | Sun et al. |
| 5,808,272 | A |   | 9/1998  | Sun et al. |
| 6,100,815 | A |   | 8/2000  | Pailthorp |
| 6,452,478 | B1|   | 9/2002  | Dale .......................... 338/195 |
| 6,534,743 | B2|   | 3/2003  | Swenson et al. ....... 219/121.69 |

(Continued)

FOREIGN PATENT DOCUMENTS

| JP | 01-300592 | 12/1989 |
| JP | 09-171911 | 6/1997 |
| JP | 09-180917 | 7/1997 |

OTHER PUBLICATIONS

Roydn D. Jones, "Hybrid Circuit Design and Manufacture". Copyright 1982 by Marcel, Dekker Inc. pp. 30-86.*

(Continued)

*Primary Examiner*—Tu B Hoang
*Assistant Examiner*—Thien Tran
(74) *Attorney, Agent, or Firm*—Stoel Rives LLP

(57) ABSTRACT

Thermoelectric effects that occur during laser trimming of resistors (20) are resolved by taking voltage measurements. The voltage attributed to laser heating on a resistor (20) during a low-power simulated trim (10) is used to determine a relatively thermal-neutral location (18) on the resistor (20). A trimming-to-value operation can then be performed on all like resistors (20). Voltage measurements can also be taken before and after every pulse in a trimming operation to establish thermal deviation information that can be used to offset the desired trim value against which resistor measurement values are compared. Spatially distant or nonadjacent resistors (20) in a row or column can also be trimmed sequentially to minimize heating effects that might otherwise distort resistance values on adjacent or nearby resistors (20).

35 Claims, 7 Drawing Sheets

U.S. PATENT DOCUMENTS

| | | | | |
|---|---|---|---|---|
| 6,664,500 | B2 | 12/2003 | Wilbur et al. | 219/121.69 |
| 6,664,837 | B1 | 12/2003 | Oh et al. | 327/270 |
| 6,686,726 | B1 | 2/2004 | Boylan | 323/266 |
| 7,241,669 | B2* | 7/2007 | Swenson et al. | 438/463 |
| 2002/0100749 | A1* | 8/2002 | Swenson et al. | 219/121.69 |
| 2002/0162973 | A1 | 11/2002 | Cordingley et al. | 250/492.2 |
| 2003/0178396 | A1* | 9/2003 | Naumov et al. | 219/121.69 |
| 2003/0179036 | A1 | 9/2003 | Gammie et al. | 327/513 |
| 2003/0189436 | A1 | 10/2003 | Lindolf et al. | 324/715 |
| 2003/0193361 | A1 | 10/2003 | Romas, Jr. et al. | 327/308 |
| 2004/0009618 | A1* | 1/2004 | Couch et al. | 438/13 |
| 2004/0099647 | A1 | 5/2004 | Biunno et al. | 219/121.69 |
| 2005/0062583 | A1 | 3/2005 | Naumov et al. | 338/195 |

OTHER PUBLICATIONS

Embedded Passives: Laser Trimmed Resistors [online], accessed via the Internet [retrieved on Apr. 16, 2009] URL: <http://aept.ncms.org/0203%20ESI%20CircuiTreeFeature.pdf>.*

Dow, Robert, et al., "Reducing Post-Trim Drift of Thin-Film Resistors By Optimizing YAG Laser Output Characteristics," reprinted from IEEE Transactions on Components, Hybrids, and Manufacturing Technology (Dec. 1978).

Albin, Arthur G., et al., "Laser Resistance Trimming from the Measurement Point of View," reprinted from IEEE Transactions on Parts, Hybrids, and Packaging, vol. PHP-8, No. 2 (Jun. 1972).

International Search Report and Written Opinion concerning related International Application No. PCT/US2005/031909.

Arthur G. Albin and Edward J. Swenson, Laser Resistance Trimming from the Measurement Point of View, Jun. 1972, 7 pages.

Alan Cable, Solving the High Speed Laser Trimming Puzzle, Sep. 1984, 6 pages.

Edward J. Swenson, Laser Processing of Semiconductors and Hybrids, Jan. 21-22, 1986, 10 pages.

Keithley Instruments, Inc., Configuring a Resistor Network Test System with the Model 2400 SourceMeter Instrument, 2001, 8 pages.

John J. Felten and Saul Ferguson, Embedded Ceramic Resistors and Capacitors in PWB—Process and Design, undated, 9 pages.

Dr. D.O.K. (Kim) Fjeldsted and Stacey L. Chase, Trimming Embedded Passives: Cost of Ownership, http://www.circuitree.com/CDA/ArticleInformation/features/BNP_Features_Item/0,2133,82744,00.html, visited Sep. 3, 2004, 8 pages.

Dr. D.O.K. (Kim) Fjeldsted, Embedded Resistor Laser Trim, Jan. 30, 2003, 35 pages.

Compoundsemiconductor.Net, Anadigics gets in trim with laser patent, http://www.compoundsemiconductor.net/articles/news/8/8/4/1, visited Sep. 3, 2004, 2 pages.

Written Opinion (Aug. 29, 2008) of the Austrian Patent Office concerning related Singapore Application No. 200701456-6 derived from International Application No. PCT/US2005/031909.

Apr. 30, 2009 Office action in connection with co-pending U.S. Appl. No. 11/218,302.

Apr. 17, 2009 Office action in connection with corresponding Chinese. Pat. Appl. No. 2005800306567.

* cited by examiner

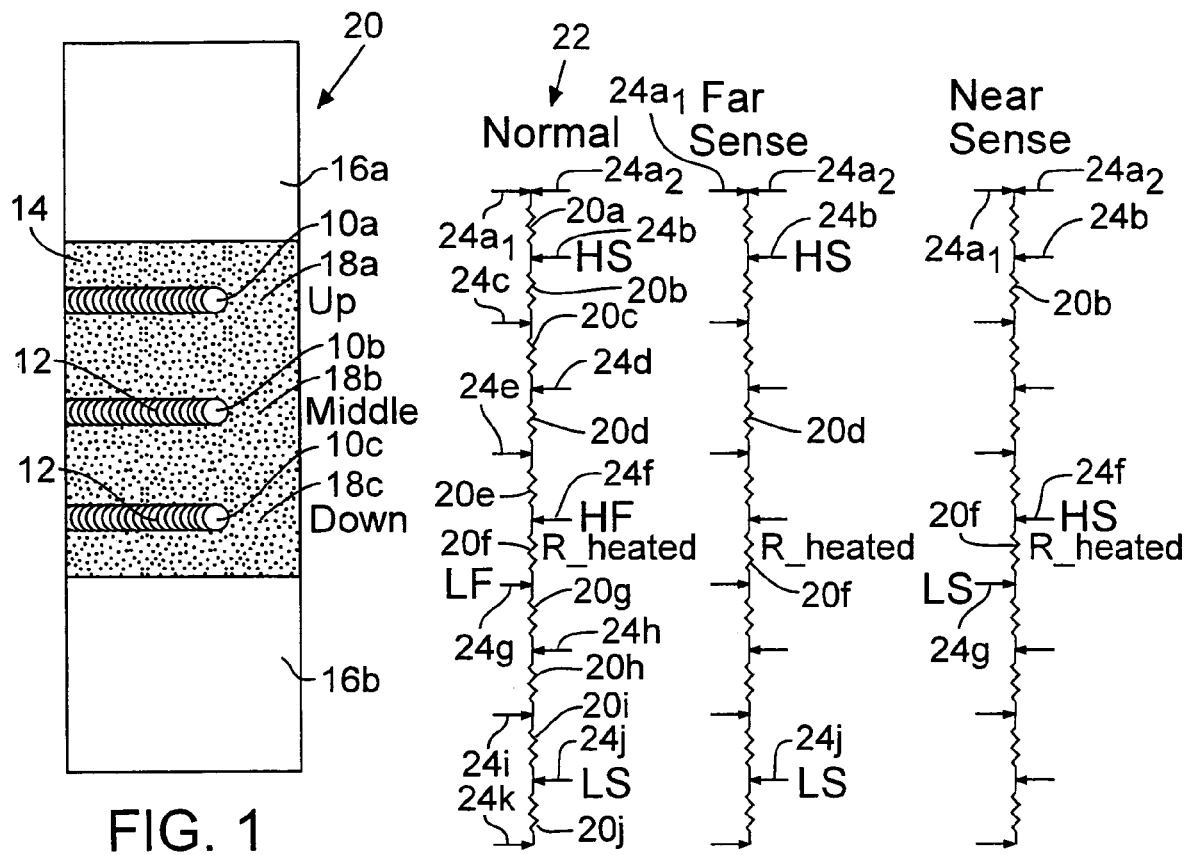
FIG. 1    FIG. 2A    FIG. 2B    FIG. 2C
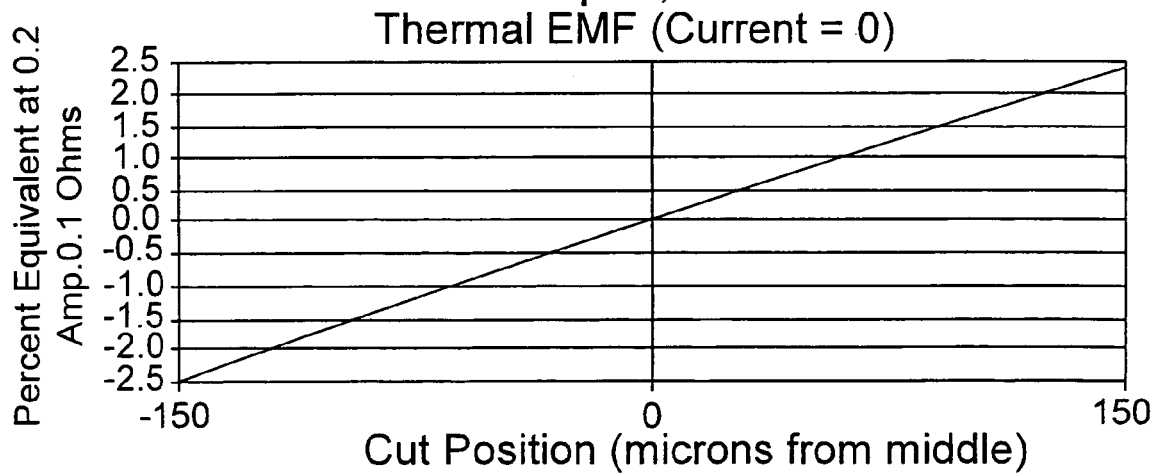
FIG. 3    Approx 10mj Laser Energy

RESOLVING THERMOELECTRIC POTENTIALS DURING LASER TRIMMING OF RESISTORS

RELATED APPLICATIONS

This patent application claims benefit of U.S. Provisional Application No. 60/609,852, filed Sep. 13, 2004.

COPYRIGHT NOTICE

© 2005 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This invention relates to laser trimming and, in particular, to resolving errors caused by thermoelectric potentials that occur during laser trimming of resistors.

BACKGROUND OF THE INVENTION

The electronics industry employs laser systems to trim thick or thin film resistors to relatively desired resistance values. An article by Albin et al., entitled "Laser Resistance Trimming from the Measurement Point of View," IEEE Transactions on Parts, Hybrids, and Packaging; Vol. PHP-8, No. 2, June 1972, describes measurement issues and the advantages of using a solid-state laser for trimming thin film resistors. An article by Swenson et al., entitled "Reducing Post Trim Drift of Thin Film Resistors by Optimizing YAG Laser Output Characteristics," IEEE Transactions on Components, Hybrids, and Manufacturing Technology; December 1978, describes using green (532 nm) solid-state laser Gaussian output for trimming thin film resistors to reduce heat-affected zones (HAZ) and post-trim drift.

U.S. Pat. Nos. 5,569,398, 5,685,995, and 5,808,272 of Sun and Swenson describe the use of nonconventional laser wavelengths, such as 1.3 microns, to trim films or devices to avoid damage to the silicon substrate and/or reduce settling time during passive, functional, or activated laser trimming techniques. U.S. Pat. No. 6,534,743 of Swenson et al. describes the use of a uniform laser spot in a generally ablative non-thermal wavelength to reduce microcracking, HAZ, and shifts in the temperature coefficient of resistance (TCR).

Some resistor trimming techniques employ a measure/predict trim measurement process that measures a resistor's value with the laser not cutting and then predicts how much additional laser trimming should be conducted to reach a desired value. This predictive trim procedure may be performed only once during a resistor trimming operation or repeated several times, and is relatively slow since the resistor must be allowed to stabilize in order to provide the required measurement accuracy.

Some resistor trimming techniques employ a tracking trim or continuous trim process. Under typical tracking trim or continuous trim operations, a current or voltage is applied to the resistor device under test (DUT) and the resistance is monitored while the resistor is being trimmed. Some tracking or analog trimming and measurement processes measure a resistor's value after every pulse. In these techniques, the laser pulsing is stopped as soon as the resistor reaches the desired value. Measure/predict trimming can be more accurate since more time is available to make measurements; however, tracking trim is typically faster, particularly when measurement settling delays are minimized. However, the accuracy of such techniques can be limited when certain transient deviation effects are not considered.

The laser trimming process raises the temperature of the resistor. This added heat affects the measured resistance due to the TCR of the resistor, laser-induced thermal electromotive forces (EMFs), and currents such as those caused by Seebeck and Peltier effects. Fixed offsets in measurement can be typically corrected by using auto-zeroed measurements. Offsets caused by the actual laser trimming are more difficult to correct, particularly for low resistance values. These errors are more difficult to correct because the transient effects caused by heating cannot be practically addressed in a tracking trim process. In addition, the thermal effects in low-value resistors become greater in proportion to the voltages used to measure the resistance across the low-value resistors. These heating effects can be particularly significant in high-gain or critically-balanced circuits and in low-ohm resistors, such as resistors having values less than or equal to 10 ohms. Low-ohm resistors are frequently employed for current sensing applications and as measurement shunts, and may have values of less than or equal to 0.1 ohms.

As the ohmic value of the resistors being trimmed gets lower, induced thermal (i.e., thermocouple) voltages may become larger compared to the ohmic voltage of the resistor. Thermal voltages equivalent to several percent of the voltage developed by 0.2 amps in a 0.1-ohm resistor have been observed.

SUMMARY

An object of the invention is to facilitate high speed trimming of resistors or other electrical components by resolving inaccuracies associated with thermoelectric effects that accompany laser trimming.

In one embodiment, the significance of the voltage deviations due to laser heating may be determined by making voltage measurements, before and after application of laser pulses simulating a laser trim, while no excitation applied. If there are significant thermal voltages, these heat-induced voltages are used to determine a relatively thermal-neutral cut location on the resistor where the thermally induced voltage is minimized or near zero in order to perform the trimming-to-value operation at higher speeds. All resistors with the same configuration and same desired parameters in the same row, column, plate, or batch can be trimmed to value in the relatively thermal neutral location to achieve relatively high accuracy in the final, steady-state, desired resistance values of the trimmed resistors. Alternatively, the relatively thermal neutral location of each resistor in the same row, column, plate, or batch can be determined independently, and the determinations and trimming can be performed in a single pass, or the determinations and trimming can be conducted in separate passes.

In another embodiment, the current and, in some cases, the balance voltage are set to a zero or reference value. Then, pre-pulse and post-pulse voltage measurements can be respectively taken immediately before and after each laser pulse during a trimming operation. The pre-pulse voltage value is averaged with the last or next pre-pulse voltage value to obtain a baseline voltage value, which can then be subtracted from the post-pulse voltage value to obtain a thermal deviation voltage value. A test resistance value under an applied current can also be taken from the resistor after every laser pulse and compared with a desired final resistance value that has been adjusted to compensate for the thermal deviation voltage value. When the test resistance value is within a desired range of the adjusted desired resistance value, the laser trimming of the resistor is stopped and the process is repeated on the next resistor to be trimmed. This embodiment also facilitates obtaining relatively high accuracy in the final, steady-state, desired resistance values of the trimmed resistors.

In yet another embodiment, spatially distant resistors in a row or column can be trimmed sequentially to minimize heating effects that might otherwise distort resistance values on adjacent or nearby resistors.

Additional aspects and advantages will be apparent from the following detailed description of preferred embodiments, which proceeds with reference to the accompanying drawings.

BRIEF DESCRIPTION OF THE DRAWINGS

FIG. 1 depicts a generic resistor showing three alternative plunge cuts at different regions on the resistor.

FIG. 2A depicts typical probe locations employed for measuring a resistor's resistance value.

FIG. 2B depicts probe locations employed for measuring a thermoelectric voltage associated with a resistor.

FIG. 2C depicts alternative probe locations employed for measuring a thermoelectric voltage associated with a resistor.

FIG. 3 is an exemplary graph of average thermal EMF as a function of laser trim position on a resistor.

DETAILED DESCRIPTION OF PREFERRED EMBODIMENTS

Figure 2D:
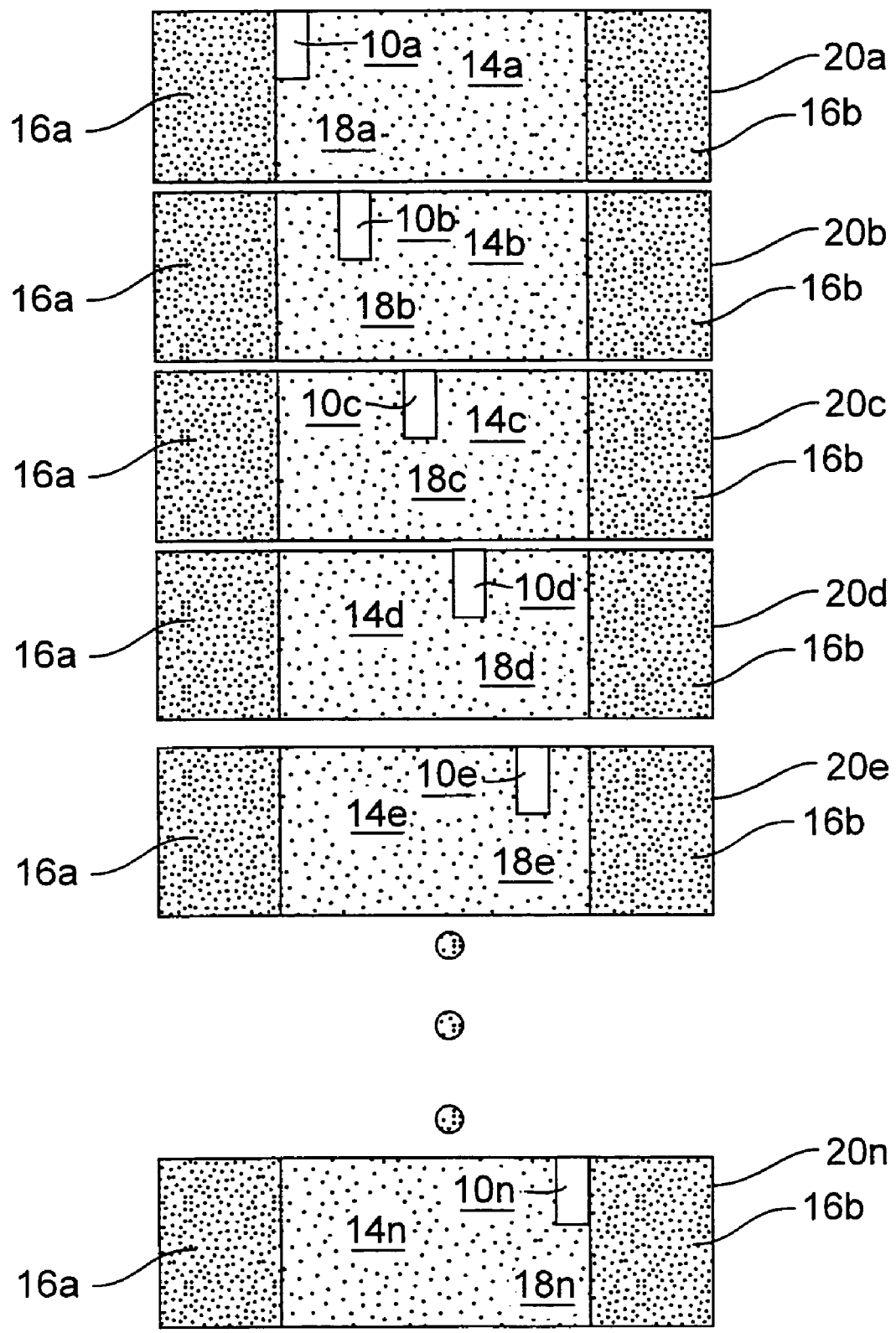
FIG. 2D depicts a set of generic resistors showing plunge cuts at different regions on the respective resistors.

Concurrently filed U.S. Patent Application for Measurement Extrapolation Technique to Compensate for Thermal EMF Generated during Laser Trimming of Brandon McCurry et al. is herein incorporated by reference.

Thermoelectric Experiments

FIG. 1 depicts three alternative plunge cuts 10a, 10b, and 10c made by a train of laser pulse spots 12 at different regions or locations 18a, 18b, and 18c (generically locations 18) on a resistive material (typically paste or film) 14 positioned between two conductive pads 16a and 16b of a generic resistor 20. With reference to FIGS. 1 and 2A, the resistors 20a-20j are typically fabricated to be interconnected in rows 22. FIG. 2A depicts the row 22 in a column orientation. Measurement probes 24 are typically connected to a probe card (not shown) and are typically positioned to contact the conductive pads 16 or alternative test pads (not shown) that provide electrical contact points across the resistors 20.

Chip resistors are typically formed on plates in resistor networks of rows and/or columns. The resistors are typically trimmed in columns or rows or groups of columns or rows in order to maximize the throughput in a single trimming pass, particularly for 2-terminal (2T) trim configurations.

Low-ohm resistance measurements are often made with four terminals, two sensing leads in addition to the two force or current leads. The extra sensing leads are attached at a fixed point and carry no large current, so they facilitate a Kelvin connection that eliminates the voltage drop error from the current leads.

However, when Kelvin trimming, the plate may be rotated by 90 degrees to accommodate probe contact to compensate for measurement input/output capability. For example, a 57-resistor (column) 0603 would require 114 probes for 2T measurement, and Kelvin measurement in the same orientation would require 228 probes. By rotating the plate by 90 degrees, Kelvin measurement would require only 78 probes.

Resistor trimming is most frequently conducted as a columnar process. In an example of row-oriented trimming, resistors 20a in adjacent rows 22 are sequentially processed. In an example of column-oriented trimming, adjacent resistors 20a, 20b, and 20c etc. in row 22 are sequentially processed. In an exemplary actual trimming-to-value operation after an initial resistance value may be measured, a cutoff comparator is monitored in order to stop the trim when the desired resistance value is reached, typically for any given leg of the trimming profile.

A double plunge cut is a common type of trimming profile where a first cut or "leg" 10a is made on a resistor 20 to bring its resistance value to within a predetermined trimming value that is below the desired final resistance value. A second cut or leg 10c is then made on the resistor 20 to bring its resistance value to a final resistance value that is hopefully within acceptable deviation of the desired resistance value. The industry practice is to design the two plunge cuts 10 to be on opposite ends of the resistive material 14 such that cuts 10 look as symmetrical and as aesthetically pleasing as possible.

FIG. 2A also depicts typical or normal probe positions employed for measuring an ohm resistance value of a typical resistor 20f. In particular, high force (HF) and low force (LF) probes 24f and 24g are positioned on immediate opposite sides of resistor 20f to provide paths for applied current or voltage, and high sense (HS) and low sense (LS) probes 24b and 24j are positioned on opposite sides of resistor 20f but are distally separated by several resistor 20 from resistor 20f. The high sense (HS) and low sense (LS) probes 24b and 24j provide distant measurement points from resistor 20f.

FIG. 2B depicts HS and LS probes 24b and 24j positioned on opposite sides of resistor 20f but distally separated by several resistors 20 from resistor 20f as employed for "far sense" measurement of a thermoelectric voltage associated with the resistor 20f.

FIG. 2C depicts alternative HS and LS probes 24f and 24g positioned on immediate opposite sides of resistor 20f as employed for "near sense" measurement of a thermoelectric voltage associated with the resistor 20f.

With reference to FIGS. 1, 2B, and 2C, in one experiment, 0402 size, 0.1-ohm resistors 20 arranged in 55 rows by 78 columns on a substrate were individually heated with a laser at three or more trim locations 10a, 10b, and 10c as shown in FIG. 1. The laser spot was defocused to provide an intensity below the trimming threshold of the resistive material. Other laser heating methods known to skilled practitioners could have been employed to provide equivalent results.

The voltage between HS and LS probes of each resistor 20 was measured just prior to the heat application and at about 300 microseconds after the laser beam propagation was terminated (or at a time interval sufficient for the most significant transient nonthermal or electrooptical effects to diminish). For convenience the voltage change was expressed as an equivalent percentage resistance change. After the subject resistor 20 cooled down from the laser heating, another measurement was taken to verify that the voltage has returned to the value that it had before the heating (nominally zero). Separate trials were conducted with either far sense or near sense connections used to measure the thermoelectric voltages. No voltages or current were applied to the resistors 20 through the probes 24. The data collected indicated that the cuts 10b placed closest to the middle location 18b provided the most thermoelectric-voltage neutral locations 18 on the resistive material 14.

Prior to the heat evaluations, evaluations were also conducted with the laser turned off in which no heat was applied to the resistors 20. The measurements in the absence of heat revealed the noise in the system and served to test of the measurement repeatability. The noise measurement was averaged and then subtracted from the measurements taken during the application of laser pulses. Alternatively, the noise may have been monitored and subtracted on a resistor-by-resistor basis.

In another experiment, single trims 10 were sequentially made in resistors 20 in sets, such as one or more columns, at a laser power and speed similar to that typically employed for resistor trimming. These actual trims 10 were monitored with a cutoff comparator or a laser distance limit to prevent trims from spanning the complete width of the resistive material 14 which would cause the resistor 20 to malfunction.

FIG. 2D depicts a set of generic resistors 20a, 20b, 20c, 20d . . . 20n showing plunge cuts at different regions on the respective resistors 20. The respective locations 18 of the first or single cuts 10 were made at respectively greater distances from contact 16a in each successive resistor 20 trimmed. The voltage between LS and HS probes of each resistor 20 was measured just prior to the trimming application and at about 300 microseconds after the laser beam propagation was terminated. For convenience the voltage change was expressed as an equivalent percentage resistance change. After the subject resistor 20 cooled down after the laser trimming, another measurement was taken to verify that the voltage has returned to the value that it had before the heating (nominally zero). Separate trials were conducted with either far sense or near sense connections used to measure the thermoelectric voltages. No voltages or current was applied to the resistors 20 through the probes 24.

FIG. 3 shows the average effect of the thermoelectric voltages on the laser cutoff value of 10-mJ laser energy tracking (normal, continuous) trim as a function of trim position with respect to the middle of resistive material 14 on 0402 0.1-ohm Chip-R resistors. The average slope of the effect was 0.017% per micron change in the trimming position. The maximum and minimum slopes measured were within 8% of the average. The difference in thermoelectric effects was approximately 9% between the far sense and near sense measurement techniques. This relatively low percentage difference leads to a conclusion that the thermoelectric junctions causing the observed effects are mostly in the resistors and are not in the probe-to-pad connections.

Figure 4:
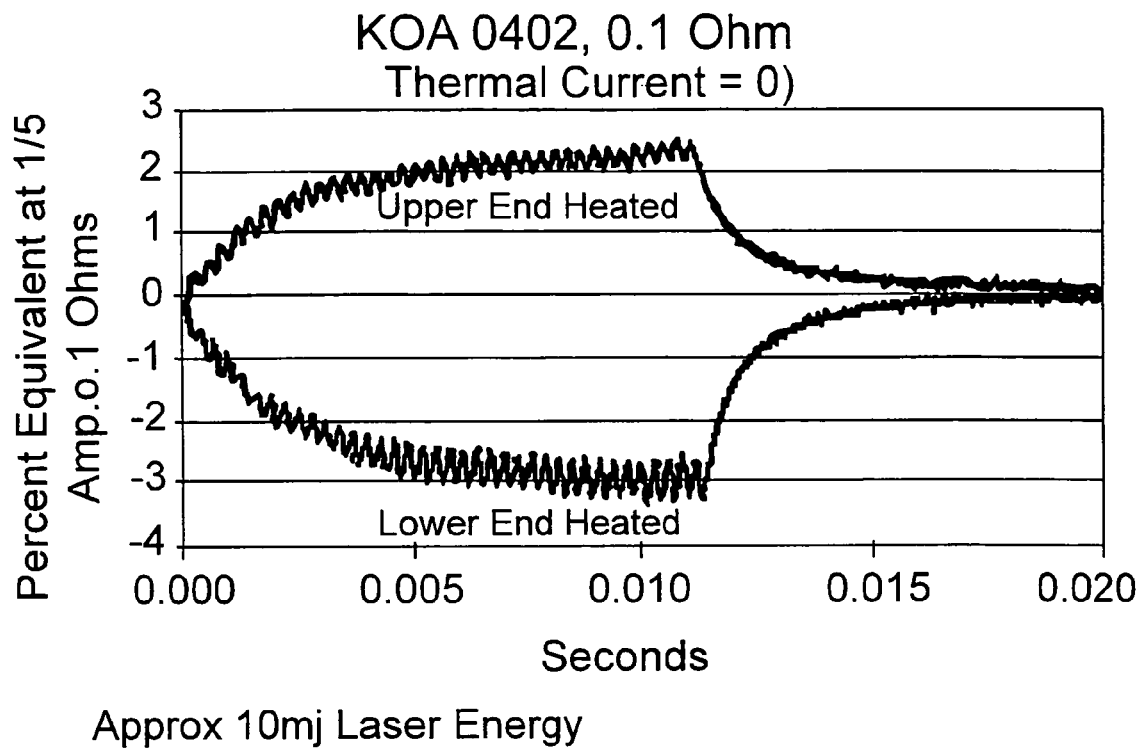
FIG. 4 is an exemplary graph of thermoelectric voltage as a function of time in response to laser heat applied to a resistor at high and low regions.

FIG. 4 shows the time response of the thermoelectric voltage generated in single resistors in response to cuts 10a and 10c at 10 mJ laser energy on 0402 0.1-ohm Chip-R resistors. The time constant of the voltage on cool-down was approximately one millisecond. As can be determined from the ripple in the voltage when the laser was on, the laser pulse rate was 3.3 kHz.

With reference to FIGS. 1-4, the data obtained in the thermoelectric experiments clearly show that the thermoelectric voltages sensed change depending upon the location 18 of the heating on the resistor 20 and the location of the sense probes 24. The heating or cutting on different sides of the middle of the resistive material 14 causes thermoelectric voltages of opposite polarity. Similar trends were discovered for a variety of different resistor types and sizes. Accordingly, it was deduced that each resistor 20 has a thermoelectric voltage-neutral location 18 on the resistive material 14 where a trim 10 could be performed to minimize thermoelectric voltage errors in resistance value determinations that influence how much trimming is performed on each resistor 20. Unfortunately, skilled persons will appreciate that each type, batch, and/or individual resistor 20 may have a thermoelectric voltage-neutral location 18 that deviates from the exact middle of the resistive material 14.

In view of the foregoing experiments, an optimal location 18 for performing a trim 10 on a resistor 20 can be determined that will minimize certain TCR and Seebeck thermoelectric effects. Performing or simulating trims 10 in a resistor 20 over the length of the resistor DUT 20 can show the magnitude of the thermoelectric voltage as a function of trim location 18. With this information, the optimal location 18 to trim a resistor 20 or batch of resistors 20 can be determined to minimize the effects during normal trimming procedures.

In an exemplary embodiment, a workpiece positioning system, such as a step-and-repeat table or other embodiments as later described, moves a resistor workpiece 40 to a position where the test probes 24 will come down on the contact pads 16. The probes 24 are lowered (i.e., connected) to the resistors 20, and the measurement system is turned on an initialized as indicated process step 60 of FIG. 2F, which is a simplified flow diagram of the measurement system set up.

Figure 2E:
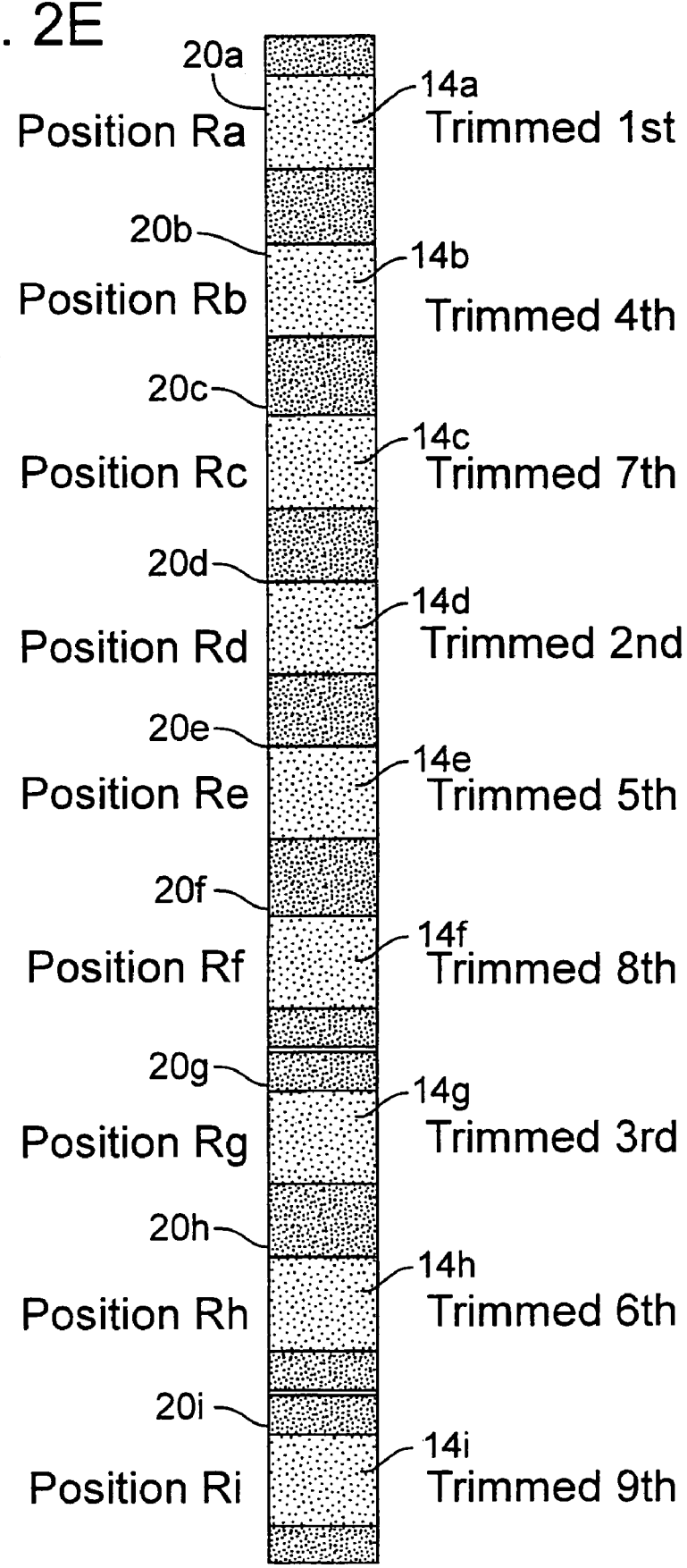
FIG. 2E depicts a set of generic resistors in a column and an exemplary order in which they are processed.
Figure 2G:
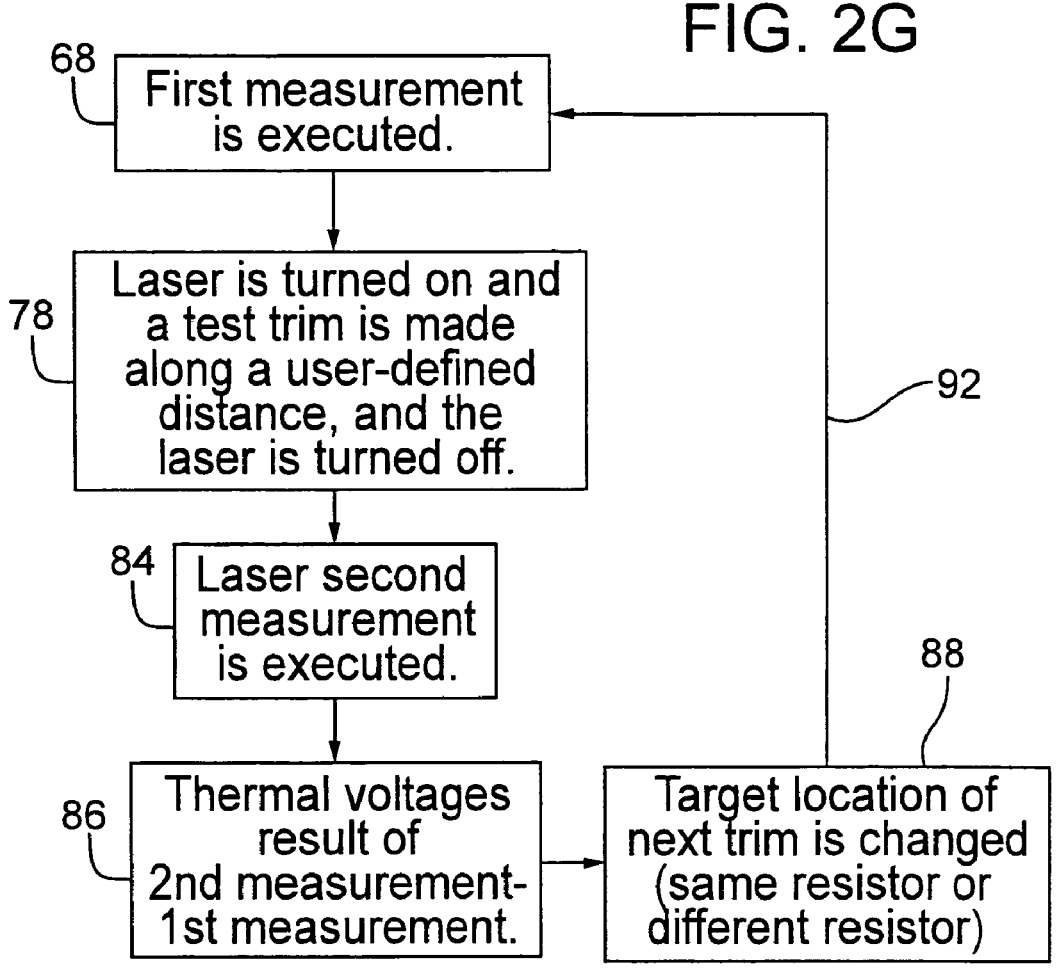
FIG. 2G is a simplified flow diagram of an exemplary measurement system test routine.
Figure 2F:
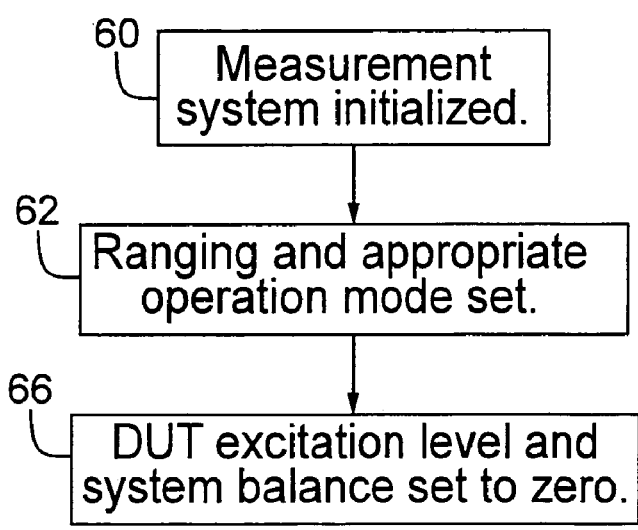
FIG. 2F is a simplified flow diagram of an exemplary measurement system set up.

With reference to FIG. 2F, the measurement system is calibrated based on the nominal resistance value entered by a user. From this calibration, the measurement board will have the appropriate hardware settings and ranging needed to trim a particular resistor 20 as indicated in process step 62.

The excitation (current and/or voltage) through the resistor DUT 20 is set to a zero such that no current is forced through the resistor 20, as shown in process step 66. This setting results in a near zero volt (or baseline value) value since the first off measurement will be of an unexcited resistor 20 as indicated process step 68 of FIG. 2G, which is a simplified flow diagram of the measurement system test routine.

Thus, with reference to FIG. 2F, when the laser cuts or heats the resistor 20 as indicated in process step 78, the thermoelectric voltage deviations attributed to laser heating can be determined by taking the difference (process step 86) between the voltage measurements taken just before the laser is turned on (process step 68) and immediately after the laser is turned off (process step 84). After a short time, another measurement (second off measurement) may be taken to determine whether the resistor 20 returned to its original voltage value before trimming began to ensure the resistor 20 did not significantly change resistance and/or voltage value. The process is then repeated at different locations 18 on the same or different resistors 20 as later described as indicated by process step 88 and return arrow 92.

In some embodiments, the laser parameters, such as laser power, are preferably set within a process window that does not cause significant removal of resistive material 14 and/or does not cause a significant change between the steady state pre-simulation resistance value and the steady-state post-simulation resistance value. The evaluation can, however, be performed with the laser at normal trimming parameters, such as power and speed. The laser may be focused or not. The trim lengths are preferably adjusted so the resistor 20 under test is not cut through or open. The trim lengths can be adapted to cease before heat saturation occurs and may, for example, be about one quarter or up to one half of the width of the resistive material 14.

The heat-induced voltage can be charted across desired locations 18 on the surface area of the resistive material 14. As demonstrated in the experiments discussed above, depending on the physical location 18 of the trim 10, whether it is toward the top or bottom, or left or right of the resistor 20 depending on column- or row-oriented trimming, positive and negative voltage shifts from the original value can be determined. A series of simulated or actual trims 10 having different locations 18 from top to bottom can thus be used to determine sufficient thermal voltage deviation information to locate a relatively thermal-neutral location 18 on the resistor 20 where a laser trimming-to-value operation can be performed such that thermal effects generated from the laser are minimized.

This location information can then be used to appropriately set the location 18 of a single leg trim 10 or the location 18 of a second or additional leg trim 10 of a multiple plunge cut or other trim profile. The location information can be stored in some manner, such as in a CAD file, and delivered directly or indirectly to the appropriate controller or beam delivery component of the laser beam delivery and workpiece positioning system. Such beam delivery components may include, but are not limited to, error correction components, fast positioning components such as galvanometers or other fast steering mirrors, or one or more AOM devices. The desired location information could be handled like an error correction or integrated with original beam delivery data.

All resistors 20 with the same configuration and same desired parameters in the same row 22, column, plate, or batch can be trimmed to value in the established relatively thermal-neutral location 18 to achieve relatively high accuracy in the final, steady-state, desired resistance values of the trimmed resistors 20.

In one embodiment, multiple simulated trims 10, such as from 3 to 50 simulated single plunge type trims 10, can be made across the resistor 20 as demonstrated in FIG. 1. Skilled person will appreciate that the simulated trims 10 can be alternatively be double plunge-cut profiles; L-, J-, or U-cut profiles or their variations; serpentine-cut profiles; area- or scan-cut profiles; surface-ablation profiles; or any other type or combination of laser trimming profiles. In some embodiments, the simulated trims 10 are performed on a single resistor 20.

However, the simulated trims 10 may be performed on a set of like resistors 20 in one or more rows 22 or columns, for example, with perhaps the simulated trims 10 being performed at a different location 18 on each resistor 20 in the set, such as demonstrated with respect to FIG. 2D. For example, each resistor 20 in a row 22 or column may be tested with the same simulated trim profile, but in a slightly different location 18 to determine the best location 18 for all resistors 20 on the plate or in the batch. Such set may be sequentially nonadjacent resistors 20 as described later. Additional resistors 20 in additional sets could also be evaluated as additional different locations 18 are desired for testing.

In another embodiment, a single top-to-bottom simulated line or contact-to-contact trim (vertical plunge-cut profile) may be used to determine the preferred trim location. Such an exemplary simulated trim and evaluation process may be performed on only a single resistor 20 in a column, plate, or batch of like resistors 20. Alternatively, such exemplary simulated trim and evaluation process may be performed on every resistor 20, on one resistor 20 for each column or plate, or on resistors 20 at appropriate time or numerical intervals. When the majority of resistors 20 are to be independently evaluated, an entire column or plate of resistors 20 may first be evaluated in an evaluation run before a trimming run is performed on all resistors 20 in the column or plate so that laser power and other parameters do not have to be switched between each resistor 20. However, skilled persons will appreciate that a given resistor 20 could be evaluated and processed before the subsequent resistor 20 is evaluated and processed. It is foreseeable that one or multiple column evaluations may provide the fastest scenario for independently evaluating each resistor 20 to minimize the number of probe placements. As described above, the preferred trim locations 18 can be stored with software or hardware.

Skilled person will further appreciate that the evaluations of the thermal neutral trimming locations 18, whether on single or multiple resistors, may be performed in an exhaustive fashion by testing a predetermined number of locations 18 on one or more predetermined number of resistors 20. Alternatively, the data may be evaluated as it is being collected such that evaluations may be terminated once a thermal neutral location 18 is established within a desired degree of certainty. For example, when multiple locations 18 are evaluated on a single resistor 20, such as from top locations 18a to bottom locations 18c, the evaluation may be terminated as soon as a sufficient number of bottom locations 18c have been evaluated to determine that the thermal neutral location 18 was above them. Similarly, when multiple resistors 20 are evaluated at different locations 18, such as from the top locations 18a to the bottom locations 18c, the evaluation of additional resistors 20 may be terminated as soon as a sufficient number of bottom locations 18c have been evaluated on different resistors 20 to determine that the thermal neutral location 18 was above the bottom locations 18c previously evaluated.

As discussed previously, simulated trims may also be measured with the laser turned off in order to monitor and account for noise within the measurement system. The output of the measuring system may be a voltage proportional to resistance or conductance, and changes in that voltage is a noise measurement. If the scaling (i.e., gain) is the same as normal, the noise result will have the same units as normal measurements. An advantage of this approach (compared to observing the variation in resistance readings) is that compensation for resistance value is automatic. The noise values may be collected and employed individually or may be collected, averaged, and employed universally.

With reference again to FIGS. 2B and 2C, measurement values may also be impacted by the positions of the test leads (i.e., the measurement probes 24 and wires that connect to the resistors 20). The probe positions can, therefore, be adjusted to minimize noise and variations or errors resulting from transient thermal effects. In some embodiments of Chip-R trimming for example, row-oriented trimming with the resistors 20 in a row 22 connected end-to-end may be preferred so that the sense probe connections can be moved away from the resistor 20 being heated by the laser. The "high" connections may also be placed on the same end, such as the "up" end, of all of the resistors 20 so that the thermoelectric effects are in the same direction and the offsets caused by laser heating are more consistent and correctable. Skilled persons will appreciate, however, that the high connections could be placed at the "down" end, or the high connections could vary from up to down, particularly if such variation became useful for enhancing throughput. The probes 24 employed for measurement may also be on the same side of the probe card in order to minimize the size of the noise pickup loop made by the leads.

Referring again to FIG. 2A, a normal trimming operation trims spatially successive resistors 20, such as a row 22 of 55 chip-R resistors, in a columnar fashion. If these resistors 20 are connected in a column-oriented row 22, the heat from the resistor 20a undergoing a trimming operation can heat up the next resistor 20b and influence its test values as well. Similarly, heat from the resistor 20b undergoing a trimming operation can heat up the next resistor 20c and so on.

To avoid having the heat from one resistor 20a affect the measurement of the successive resistor 20b as a result of being too close to it or its probes 24, the resistors 20 are grouped into sets, which can be of equal or near equal numbers of resistors 20. The sets are trimmed in order but the resistors 20 contained in each set are at different or nonadjacent locations in the column. In some embodiments, each set preferably contains resistors 20 near the top, middle, and bottom of the row 22 or column, such that the first resistor 20 in the set to be trimmed is located near the top, the second resistor 20 in the set to be trimmed is located near the bottom, and the third resistor is near the middle, for example. The process then repeats with the first resistor 20 of the second set at the top and so on.

FIG. 2E depicts a set of generic resistors 20a-20i positioned sequentially in respective positions Ra-Ri in a column. With reference to FIG. 2E, an exemplary processing order for such a set of nine resistors 20 might start with the processing of the resistor 20a in position Ra. Then, resistor 20d at position Rd might be processed second, resistor 20g at position Rg might be processed third, resistor 20b at position Rb might be processed fourth, resistor 20e at position Re might be processed fifth, resistor 20h at position Rh might be processed sixth, resistor 20c at position Rc might be processed seventh, resistor 20f at position Rf might be processed eighth, and resistor 20i at position Ri might be processed ninth.

Skilled persons will appreciate that the number of sets or the number of resistors 20 therein can be determined in a manner that maximizes processing speed within the field of view capabilities of the laser beam delivery and material positioning system or the field of view capabilities of any of its components. In one exemplary embodiment, the resistors 20 are grouped into five sets, such that the order in which the resistors 20 are heated or trimmed is 1, 34, 12, 45, 23, 2, 35, 13, 46, 24, 3 . . . where the resistors 20 in the column-oriented row 22 are sequentially positioned 1, 2, 3 . . . .

Different spacings or groupings could be used to accommodate different numbers of resistors 20 in a row 22 or column. Skilled persons will also appreciate that the nonadjacent resistor trimming (or sequence hopping process or 1, 4, 2, 5, 3 process) can also be employed for row-oriented processing or when multiple rows 22 or columns are being processed simultaneously. For example, in a column-oriented process, the beam may sequentially process resistors 20 that may be in different rows 22 within the field of view of the positioning and delivery system. Skilled persons will further appreciate that the nonadjacent resistor trimming process can be used in combination with any of the other techniques disclosed herein.

Resistors 20 were trimmed to a standard deviation of 0.2% (good enough for 1% resistors) using the trimming sequence and connection methods described above. These particular results were obtained using double-plunge trims with the second plunge cut 10 centered at about location 18b on the resistors 20. Employing the exact thermal neutral location 18 could have improved these results even further. Another feature of the connection method used was having both sense leads of the full-Kelvin connection on the same side of the probe card in order to minimize inductively coupled noise.

With reference again to FIG. 4, the reading with the excitation turned off appears to vary as a function of time, particularly if the heating occurs away from the thermal neutral location 18. This measurement variation may affect and introduce an error into the calculation of the trimmed resistance value and ultimately reduce the accuracy of the final resistance values or reduce the yields of resistors 20 having resistance values within predetermined ranges.

Conventional auto-zero measurements have two stages. One measurement is taken with the excitation on and another measurement is taken just after the excitation is turned off. These measurements are then subtracted from each other in an effort to cancel out any offsets that exist on the measurement board. Based on the findings shown in FIG. 4, however, the reading with the excitation turned off appears to vary as a function of time (and distance from the thermal neutral location 18) so the measurement values could be increasing or decreasing with time.

To correct for these errors and deviations, a new procedure referred to as "odd-cycle" auto-zero measuring can be implemented. In odd-cycle" auto-zero measuring, three readings are taken. A first measurement is taken with the excitation off before a trim (or test trim) is performed; a second measurement is taken with the excitation on (during the trim); and a third measurement is taken with the excitation off again (after the trim). Because the time interval between each measurement is known, one can interpolate where the measurement value with the excitation off should be to accurately give an auto zero measurement, i.e., what the baseline value was at the time the measurement with the excitation on was taken.

In some embodiments, the third measurement can be taken at a time interval sufficient for the most significant transient (thermal and nonthermal) effects to diminish. If thermal testing is conducted as previously described, then the delay before the third measurement can be more accurately shortened to a minimum time interval, such as the time associated with a near zero point in the graph of FIG. 4, and may optionally be conducted without confirmation of complete settling. If the trimming is conducted on the thermal neutral location 18, then the time interval before the third measurement can also be even more further minimized.

Figure 5:
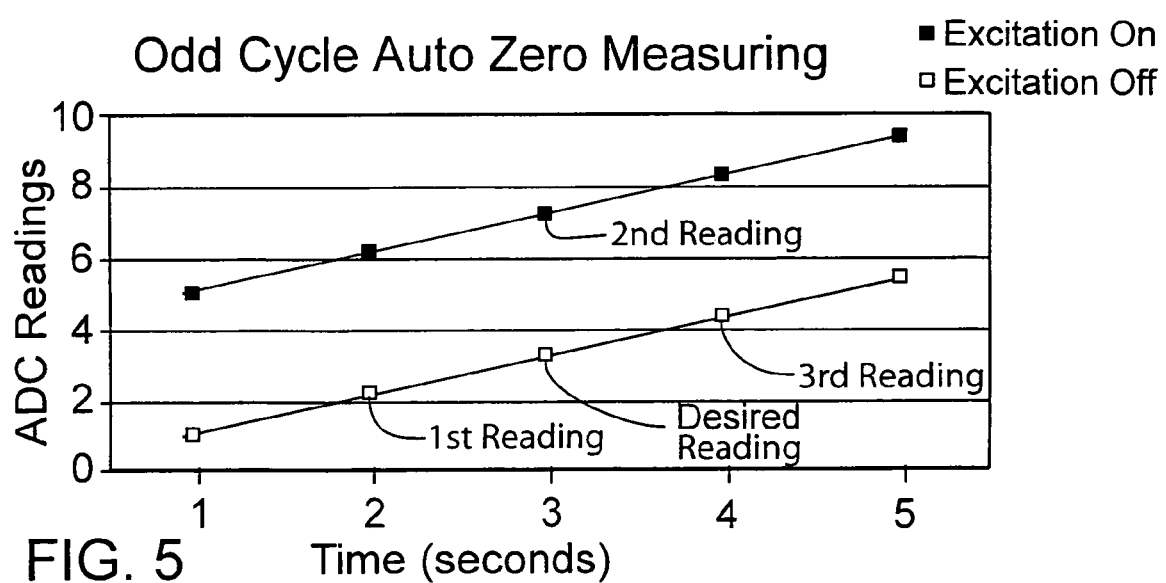
FIG. 5 is an exemplary graph of thermoelectric voltage as a function of time in response to laser heat applied to a resistor during different measurement cycles.

FIG. 5 demonstrates an example of this procedure in which these measurements are evenly spaced as a function of time, i.e., the second measurement is taken at the midpoint in time between the first and third measurements. If the changing offset is linear, the average of the first and third measurements provides a close approximation of what the measured (baseline) value would be in the absence of an excitation pulse at the time of the second/"on" measurement. Alternatively, this baseline value can be extrapolated using an exponential or some other function to accommodate the shape of the thermal offset such as seen in FIG. 4. The time intervals for the measurements will vary with different laser parameters and different types, materials, and brands of resistors 20 as will the extrapolation functions.

The extrapolated baseline value can then be subtracted from the second measurement value in the auto-zero measurement cycle to provide a more accurate value for the second or "on" measurement. Such an odd cycle auto-zero measuring procedure allows the trimming process to proceed at a faster rate because measurements of the required accuracy can be made after a shorter delay following a laser pulse, i.e. the conventional settling time can be minimized. The extrapolated values can also be used to enhance accuracy, such as for setting the value of the cutoff comparators.

Figure 6:
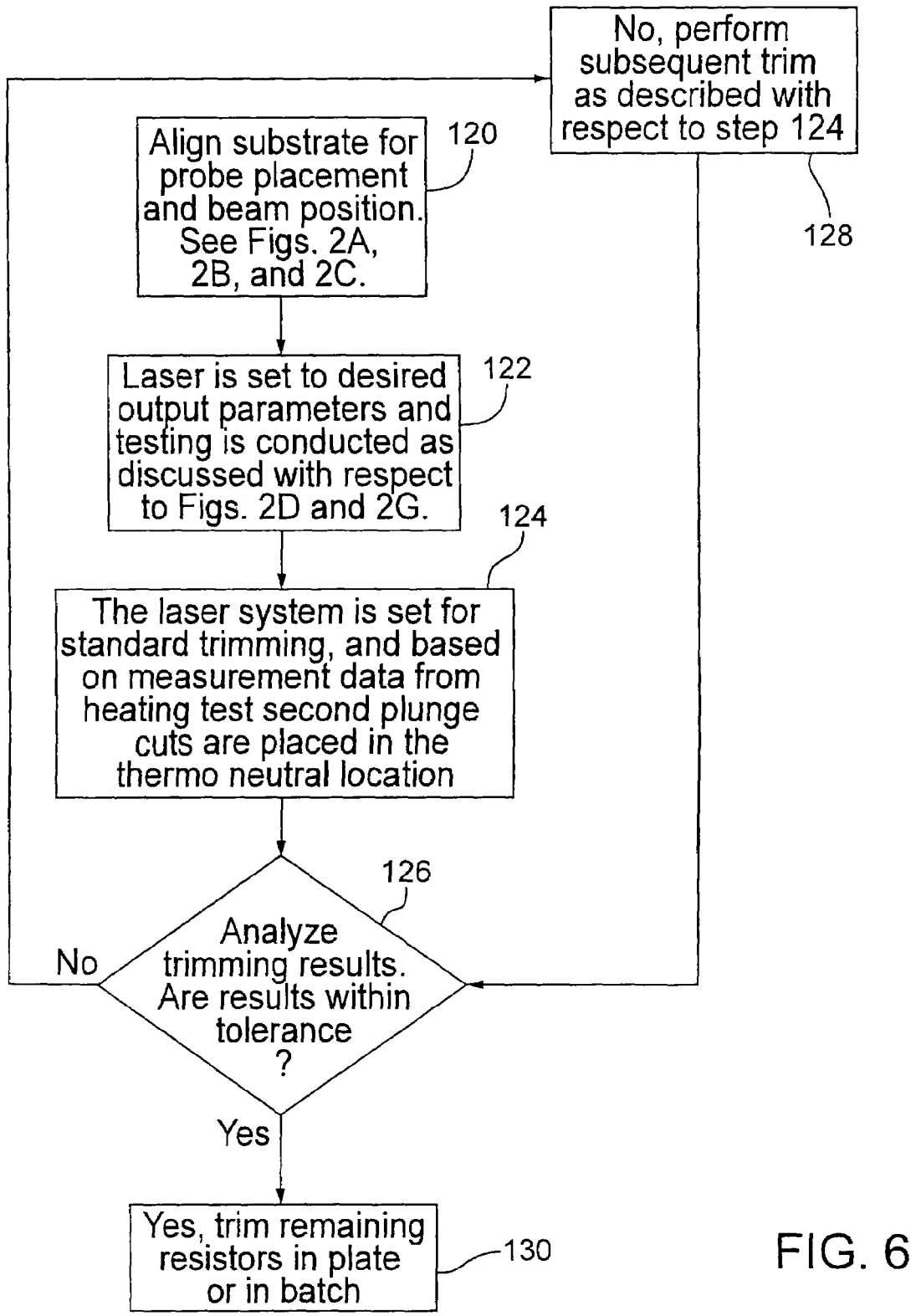
FIG. 6 is a simplified flow diagram of an exemplary resistor trimming process including testing and measuring.

FIG. 6 is a simplified flow diagram of an exemplary resistor trimming process including testing and measuring. Reference to FIG. 6, in a generic testing and trimming process, the workpiece 40 is aligned for probe placement and/or beam positioning and the probes 24 are brought into contact with the resistors 20 as indicated by process step 120. If not previously done, the measurement system is turned on an initialized as discussed with respect to FIG. 2F.

Figure 7:
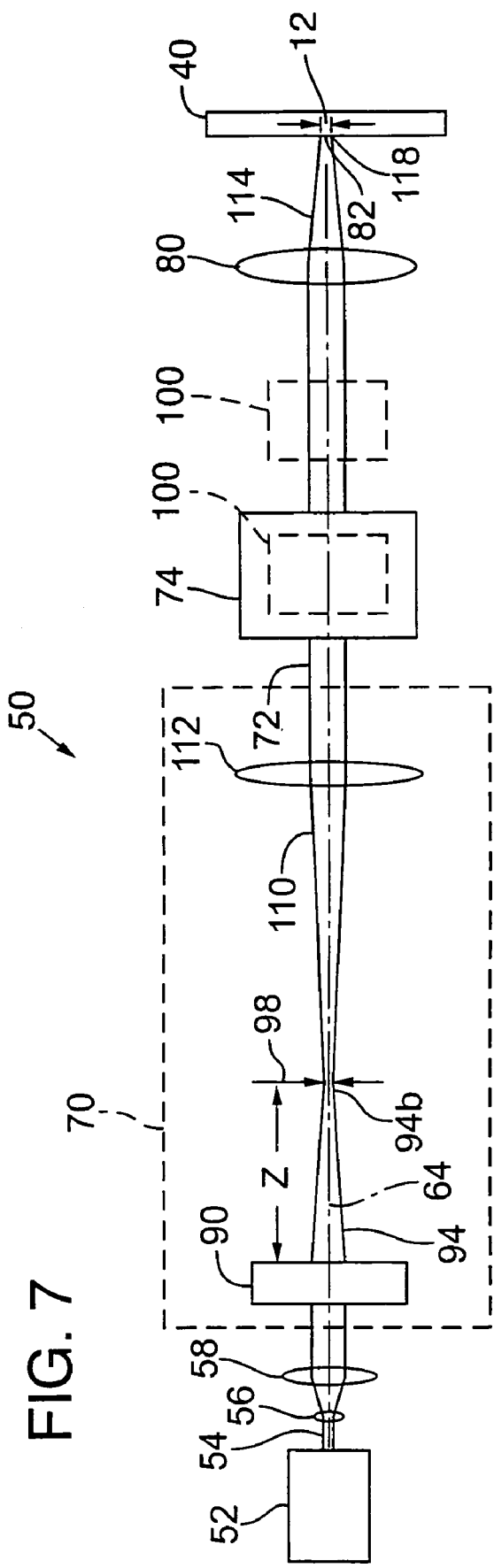
FIG. 7 is a schematic diagram of an exemplary laser trimming system that can be employed to provide laser output as needed to perform the various applications presented herein.

As indicated in process step 122, the laser system 50, as later described in FIG. 7, is set to produce desired laser output, and testing is conducted as discussed with respect to FIGS. 2D and 2G. The trimming tests may include a no pulse mode to test and account for system noise. If multiple resistors 20 are tested, the sequence hopping procedure described with respect to FIG. 2E may be utilized during the testing procedure.

As indicated in process step 124, the laser system is set for a standard trimming run parameters. A trimming profile, such as a plunge cut 10 (or a second plunge cut 10 if the heating test employed actual trimming) is performed in the established thermal neutral location(s) 18 on a subset of resistors 20, such as a column or plate of resistors 20. The sequence hopping procedure described with respect to FIG. 2E and the odd cycle auto measuring procedure as described with respect to FIG. 5 may also be employed.

As indicated in process step 126, the trimming results of the subset of resistors 20 is analyzed to determined if their resistance values are within tolerance. If the results do not meet production standards, then, as indicated in process step 128, the resistors 20 are subjected to a subsequent trim as described with respect to process step 124. If the results meet production standards, the remaining resistors 20 on the plate or in the batch are trimmed as indicated in process step 128.

With reference to FIG. 7, one embodiment of a laser system 50 employed for resistor trimming on a workpiece 40, such as a wafer containing rows 22 and columns of thick or thin film resistors 20, uses a Q-switched, diode-pumped (DP), solid-state (SS) ultraviolet (UV) laser 52. Exemplary solid-state lasants include, but are not limited to, Nd:YAG, Nd:YLF, or Nd:YVO$_4$. Laser 52 may provide harmonically generated laser pulses or output 54 at a wavelength such as 355 nm (frequency tripled Nd:YAG), 266 nm (frequency quadrupled Nd:YAG), or 213 nm (frequency quintupled Nd:YAG) with primarily a TEM$_{00}$ spatial mode profile. Skilled persons will appreciate that other wavelengths and/or their harmonics are available from the other listed lasants and could be employed, as well as any laser wavelength within a wavelength range between about 0.2 to 12 microns.

Preferred YLF wavelengths include 349 nm and 262 nm. Skilled persons will also appreciate that most lasers 52 do not emit perfect Gaussian output 54; however, for convenience, Gaussian is used herein liberally to describe the irradiance profile of laser output 54. Laser cavity arrangements, harmonic generation, and Q-switch operation are all well known to persons skilled in the art. Details of exemplary lasers 52 are described in International Publication No. WO 99/40591 of Sun and Swenson.

Although other solid-state laser wavelengths, such as green (e.g., 532 nm) or infrared (IR) (e.g., 1.06 µm or 1.32 µm), could be employed, a UV laser wavelength may be preferred for some trimming applications because it has an ablative, relatively nonthermal nature that reduces post-trim drift. A UV laser wavelength also inherently provides a smaller spot size at the surface of the workpiece 40 than provided by an IR or green laser wavelength employing the same depth of field.

The laser pulses 54 may be passed through a variety of well-known optics including beam expander and/or upcollimator lens components 56 and 58 that are positioned along a beam path 64. The laser pulses 54 may optionally be directed through a shaping and/or imaging system 70 to produce uniform pulses or output 72 that is then directed by a beam positioning system 74 to target the output 72 through a scan lens 80 to a desired laser target position 82 at the image plane on the workpiece 40. The laser output 72 may optionally be truncated (clipped), focused and clipped, shaped, or shaped and clipped.

The imaging system 70 may employ an aperture mask 98 positioned between an optical element 90 and a collection or collimation lens 112 and at or near the focus of the beam waist created by optical element 90. Such aperture mask 98 may optionally be used to block any undesirable side lobes in the beam to present a spot profile of a circular or other shape that is subsequently imaged onto the work surface. Moreover, varying the size of the aperture can control the edge sharpness of the spot profile to produce a smaller, sharper-edged intensity profile that can be used to enhance the alignment accuracy. In addition, the shape of the aperture can be precisely circular or can be changed to rectangular, elliptical, or other noncircular shapes that can be used advantageously for resistor trimming.

The mask 98 may comprise a material suitable for use at the wavelength of the laser output 54. If the laser output 54 is UV, then the mask 98 may, for example, comprise a UV-reflective or UV-absorptive material, or can be made from a dielectric material such as UV-grade fused silica or sapphire coated with a multilayer, highly UV-reflective coating or other UV-resistant coating. The aperture of the mask 98 may optionally be flared outwardly at its light-exiting side.

The optical element 90 may comprise focusing optics or beam-shaping components such as aspheric optics, refractive binary optics, deflective binary optics, or diffractive optics. Some or all of these may be employed with or without the aperture mask 98. In one preferred embodiment, a beam-shaping component comprises a diffractive optic element (DOE) that can perform complex beam shaping with high efficiency and accuracy. The beam-shaping component not only transforms the Gaussian irradiance profile to a near-uniform irradiance profile, but it also focuses the shaped output 94 to a determinable or specified spot size. Both the shaped irradiance profile 94b and the prescribed spot size are designed to occur at a design distance $Z_0$ downstream of optical element 90. Although a single-element DOE is preferred, skilled persons will appreciate that the DOE may include multiple separate elements such as the phase plate and transform elements disclosed in U.S. Pat. No. 5,864,430 of Dickey et al. The shaping and imaging techniques discussed above are described in detail in U.S. Pat. No. 6,791,060 of Dunsky et al., the relevant portions of which are herein incorporated by reference.

The beam delivery and material positioning system 74 preferably employs a conventional positioner used for laser trimming systems. Such a positioning system 74 typically has one or more stages that move the workpiece 40. The positioning system 74 can be used for moving laser spots of the shaped output 118 in an overlapping manner to form kerfs 10 along desired trim paths. Preferred beam positioning systems can be found in Electro Scientific Industries, Inc.'s Model 2300, Model 4370, Model 2370, or Model 2350 Laser Trimming Systems commercially available from Electro Scientific Industries, Inc. of Portland, Oreg. Other positioning systems can be substituted and are well known to practitioners in the laser art.

An example of a preferred laser system 50 that contains many of the above-described system components employs a UV laser (355 nm or 266 nm) in a Model 5200 laser system or others in its series manufactured by Electro Scientific Industries, Inc. in Portland, Oreg. Persons skilled in the art will appreciate, however, that any other laser type, particularly but not limited to those having a Gaussian beam intensity profile (before imaging or shaping as disclosed herein), other wavelengths such as IR, or other beam expansion factors can be employed.

The beam delivery and material positioning system 74 may also employ one or more intracavity or extra-cavity AOM devices 100 for beam positioning or power control through techniques described in U.S. patent application Ser. No. 11/138,662, which is herein incorporated by reference. In particular, the optional AOM(s) 100 may be employed to reduce laser power during simulated trims; to make adjustments to beam position, particularly with respect to the preferred trimming location 18; and to block laser pulses when appropriate.

The laser system 50 is capable of producing laser system output 114 having preferred parameters of typical resistor trimming windows that may include: an wavelength, preferably between about 180 nm and 400 nm or up through 1.3 µm; average power densities greater than about 100 mW, and preferably greater than 300 mW; spot size diameters or spatial major axes of about 5 µm to greater than about 50 µm; a repetition rate of greater than about 1 kHz, preferably greater than about 5 kHz or even higher than 50 kHz; temporal pulse widths that are shorter than about 100 ns, preferably from about 40 ns to 90 ns or shorter, or preferably shorter than 10 ns, 1 ns, or 25 µs, or perhaps down to about 1000 femtoseconds; a scan speed of about 1 mm/sec to 200 mm/sec or faster, preferably about 10 mm/sec to 100 mm/sec, and most preferably about 10 mm/sec to 50 mm/sec; and a bite size of about 0.1 µm to 20 µm, preferably 0.1 µm to 10 µm, and most preferably 0.1 µm to 5 µm. The preferred parameters of the laser system output 114 are selected in an attempt to circumvent thermal or other undesired damage to substrates upon which the resistors 20 are supported. Skilled persons will appreciate that these output pulse parameters are interdependent and are dictated by the performance required.

Skilled persons will also appreciate that the spot area of the laser system output 114 is preferably circular or square, but other simple shapes such as ellipses and rectangles may be useful, and even complex beam shapes are possible with the proper selection of the optical elements 90 cooperating with a desirable aperture shape in the mask 98. Preferred spot areas for laser trimming, more particularly for UV laser trimming, are preferably smaller than about 40 µm in diameter, more preferably smaller than about 20 µm in diameter, and most preferably smaller than about 15 µm in diameter. Skilled persons will appreciate that because the spot size of the UV laser output is smaller than the spot size of conventional laser trimming output and because uniform output 72 permits kerfs 10 to have straight uniform walls or edges and thus a smaller HAZ, resistors 20 can be trimmed to tolerances that are tighter than the tolerances possible for conventional kerf trimming techniques.

The trimming techniques disclosed herein can be employed for both thick and thin film resistor processing applications, including partial-depth trimming. With respect to thick film resistors, particularly ruthenium oxide on ceramic including the 0402 and 0201 chip resistors with a ruthenium layer height or thickness of less than about 200 µm, the preferred trimming criterion is to remove all of the ruthenium within the kerfs 10 with a minimal amount of penetration into the ceramic substrate. These desirable kerfs 10 are clean such that ceramic material is uniformly exposed and the bottom of the kerfs 10 are "white." Such cleaning often entails intentional penetration into the ceramic to a depth of about 0.1 µm to 5 µm and often at least 1 µm. The imaged shaped output 118 can provide these clean or white kerfs 10 without creating significant microcracking. UV is particularly preferred for processing resistor material over ceramic; however, other wavelengths may be employed.

Although a UV wavelength can be employed, an IR wavelength, particularly at about 1.32 µm, may be a preferred wavelength for employing a uniform spot to trim materials, such as nickel chromide (NiCr), silicon chromide (SiCr), or tantalum nitride (TaN), from silicon substrates, especially for trimming active or electro-optic devices and in applications involving functional trimming.

Skilled persons will appreciate that the trimming techniques disclosed herein may be employed on single resistors, resistor arrays (including those on snapstrates), voltage regulators, capacitors, inductors, or any other device requiring a trimming operation. In addition, the trimming techniques can be employed for surface ablation-trimming or other applications in which the imaged-shaped output 118 does not penetrate the substrate, as well as the applications in which substrate penetration is desirable.

Separating errors caused by thermal voltages is very difficult when doing a normal tracking (i.e., analog or continuous) trim. The error caused by thermal voltages can be easily evaluated by making one or more actual or simulated laser trims between two zero current measurements as previously described. The results of above-described thermal testing can be used to facilitate subsequent trim placement. The probe positioning, trim sequence, resistance measurement techniques described herein may be used to enhance throughput and/or yield. The various techniques described herein may also facilitate the use of higher speed tracking trims instead of lower speed measure-predict trims.

It will be obvious to those having skill in the art that many changes may be made to the details of the above-described embodiments without departing from the underlying principles of the invention. The following claims are only exemplary, and should be considered part of the disclosure.

The invention claimed is:

1. A method for employing laser output to trim resistor material from a resistor to change an initial resistance value of the resistor to a nominal resistance value, wherein the resistor material has a surface area positioned between electrical contacts and is supported on a substrate, wherein laser output applied to the resistor material induces thermoelectric effects in the resistor that cause the resistor to exhibit an errant or transient resistance value that deviates from a true or steady state resistance value of the resistor that is measured during an absence of the laser output such that the applied laser output prevents an accurate measurement of the true or steady state resistance value immediately following the applied laser output, a method for reducing resistance value deviations caused by laser-induced thermoelectric effects, comprising:

positioning probes of measurement equipment to be in communication with a single resistor or respective resistors from a set of resistors;

setting an applied current value from the measurement equipment to a reference or zero value;

directing respective sets of one or more evaluation pulses of laser output along respective simulation paths to apply heat to different respective locations on the surface areas of the single resistor or the respective resistors, the evaluation pulses causing insignificant change to the true or steady-state resistance value of the initial resistance value;

measuring voltage values across the single resistor or the respective resistors after the respective sets of evaluation laser pulses to obtain voltage deviation information for each of the different respective locations;

using the voltage deviation information to determine a preferred location on the respective surface areas of the respective resistors that exhibits minimal voltage deviation; and directing trimming pulses of laser output along a trim path at the preferred location on the surface area of the single resistor or the preferred locations on the surface area of some or all of the set of resistors to remove resistor material from them to change their initial resistance value to a nominal resistance value to reduce thermoelectric resistance deviations induced by the laser output.

2. The method of claim 1 in which each set of evaluation pulses comprises a single laser pulse.

3. The method of claim 1 in which the trim path comprises a plunge-cut profile, an L-cut profile, a serpentine-cut profile, or a surface-ablation profile.

4. The method of claim 1 in which the simulation paths performed at different locations on the surface area of the resistor material are substantially the same.

5. The method of claim 1 in which the simulation paths comprise a raster scan of a portion of the surface area of the single resistor.

6. The method of claim 1 in which the evaluation laser pulses have parameters that are insufficient to cause significant removal of resistor material.

7. The method of claim 1 in which the trimming laser pulses are applied in a tracking trim process wherein a resistance measurement value is obtained after each trimming laser pulse and compared to a desired resistance value and application of the trimming laser pulses is halted when the resistance measurement value is within a predetermined range of the desired resistance value.

8. The method of claim 1 in which the trimming laser pulses are applied in a predictive trim process.

9. The method of claim 1 in which the resistors comprise chip-R resistors.

10. The method of claim 1 in which the resistors comprise low-ohm resistors.

11. The method of claim 1 in which the resistors have a desired resistance value of less than or equal to 0.1 ohms.

12. The method of claim 1 in which the resistors comprise four leads.

13. The method of claim 1 in which the measurement equipment employs a Kelvin measurement technique.

14. The method of claim 1 in which the true resistance value is within 0.1% of the desired resistance value.

15. The method of claim 1 in which the preferred location is a position of relative thermal equilibrium between the contacts.

16. The method of claim 1, further comprising:
processing at the respective preferred locations multiple rows or columns of respective resistors having similar configurations and specifications.

17. The method of claim 1 in which the laser output is generated at a wavelength between 200 nm and 2,000 nm.

18. The method of claim 1 in which the resistor comprises a 0402 or 0201 chip resistor.

19. The method of claim 1 in which the substrate comprises a ceramic material.

20. The method of claim 1 in which the resistor material comprises a thick film resistor material that includes ruthenium oxide.

21. The method of claim 1 in which the resistor material includes a nickel chromium compound or a tantalum nitride compound.

22. The method of claim 1 in which the thermoelectric effects comprise temperature coefficient of resistance effects.

23. The method of claim 1 in which the thermoelectric effects comprise Seebeck or emf effects.

24. The method of claim 1, further comprising:
after determining the preferred location on the resistors, setting the applied current value from the measurement equipment to a desired nonzero value before directing trimming pulses at the single resistor or any respective resistor.

25. The method of claim 1 in which an applied balance voltage value is set to a zero or reference value before directing the evaluation pulses at the resistors.

26. The method of claim 25 in which the applied balance voltage value is set to a desired value before directing the trimming pulses at the single resistor or any respective resistor.

27. The method of claim 1 in which the evaluation laser pulses have parameters that are insufficient to cause significant alteration, after the laser-induced thermoelectric effects have subsided, in the initial resistance value of the single resistor or any respective resistor.

28. The method of claim 1 in which the voltage values are measured through relays of a probe of the measurement equipment that are distant from the resistor being measured.

29. The method of claim 1 in which each resistor is independently evaluated for its particular preferred location.

30. The method of claim 29 in which each resistor is independently evaluated before any of the resistors of the set are trimmed.

31. The method of claim 29 in which each resistor is independently evaluated and trimmed before a subsequent resistor is evaluated.

32. The method of claim 1 in which sequentially evaluated resistors are nonadjacent.

33. The method of claim 1 in which the set of respective resistors include a set of some or all connected resistors.

34. A method for employing laser output to trim resistor material from a resistor to change an initial resistance value of the resistor to a nominal resistance value, wherein the resistor material has a surface area positioned between electrical contacts and is supported on a substrate, wherein laser output applied to the resistor material induces thermoelectric effects in the resistor that cause the resistor to exhibit an errant or transient resistance value that deviates from a true or steady state resistance value of the resistor that is measured during an absence of the laser output such that the applied laser output prevents an accurate measurement of the true or steady state resistance value immediately following the applied laser output, a method for reducing resistance value deviations caused by laser-induced thermoelectric effects, comprising:

positioning probes of measurement equipment to be in communication with a resistor;

setting an applied current value from the measurement equipment to a reference or zero value;

directing low-power pulses of laser output along a simulation path to sequentially apply heat to multiple locations on the surface area of the resistor material;

repeatedly measuring voltage values across the resistor after respective sequential sets of laser pulses to obtain voltage deviation information for some or all of the multiple locations;

using the voltage deviation information to determine a preferred location on the surface of the resistor that exhibits minimal voltage deviation; and directing high-power pulses of laser output along a trim path at the preferred location on the surface area of the resistor or at the preferred location on any respective resistor on the same substrate or from a same batch of resistors to remove resistor material from the respective resistor to change its initial resistance value to a nominal resistance value to reduce thermoelectric resistance deviations induced by the laser output, the high-power laser pulses having higher power than the low-power laser pulses.

35. A method for employing laser output to trim resistor material from a resistor to change an initial resistance value of the resistor to a nominal resistance value, wherein the resistor material has a surface area positioned between electrical contacts and is supported on a substrate, wherein laser output applied to the resistor material induces thermoelectric effects in the resistor that cause the resistor to exhibit an errant or transient resistance value that deviates from a true or steady state resistance value of the resistor that is measured during an absence of the laser output such that the applied laser output prevents an accurate measurement of the true or steady state resistance value immediately following the applied laser output, a method for reducing resistance value deviations caused by laser-induced thermoelectric effects, comprising:

positioning probes of measurement equipment to be in communication with a single resistor or respective resistors from a set of resistors;

setting an applied current value from the measurement equipment to a reference or zero value;

directing respective sets of one or more evaluation pulses of laser output along respective simulation paths to apply heat to different respective locations on the surface areas of the single resistor or the respective resistors, the evaluation pulses having parameters that are insufficient to cause significant removal of resistor material;

measuring voltage values across the single resistor or the respective resistors after the respective sets of evaluation laser pulses to obtain voltage deviation information for each of the different respective locations;

using the voltage deviation information to determine a preferred location on the respective surface areas of the respective resistors that exhibits minimal voltage deviation; and directing trimming pulses of laser output along a trim path at the preferred location on the surface area of the single resistor or the preferred locations on the surface area of some or all of the set of resistors to remove resistor material from them to change their initial resistance value to a nominal resistance value to reduce thermoelectric resistance deviations induced by the laser output.

* * * * *

UNITED STATES PATENT AND TRADEMARK OFFICE
CERTIFICATE OF CORRECTION

PATENT NO. : 7,667,159 B2 Page 1 of 1
APPLICATION NO. : 11/218283
DATED : February 23, 2010
INVENTOR(S) : Pailthorp et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1211 days.

Signed and Sealed this

Twenty-eighth Day of December, 2010

David J. Kappos
*Director of the United States Patent and Trademark Office*